(12) United States Patent
Lee et al.

(10) Patent No.: US 8,989,051 B2
(45) Date of Patent: Mar. 24, 2015

(54) METHOD FOR ALLOWING ONE DEVICE TO DETECT ANOTHER DEVICE

(75) Inventors: Jihye Lee, Gyeonggi-do (KR); Jean-Francois Deprun, Paris (FR); Younsung Chu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 13/701,938

(22) PCT Filed: Jun. 3, 2011

(86) PCT No.: PCT/KR2011/004096
§ 371 (c)(1),
(2), (4) Date: Jan. 3, 2013

(87) PCT Pub. No.: WO2011/152687
PCT Pub. Date: Dec. 8, 2011

(65) Prior Publication Data
US 2013/0208626 A1   Aug. 15, 2013

Related U.S. Application Data

(60) Provisional application No. 61/383,740, filed on Sep. 17, 2010, provisional application No. 61/383,738, filed on Sep. 17, 2010, provisional application No. 61/363,619, filed on Jul. 12, 2010, provisional application No. 61/351,293, filed on Jun. 4, 2010.

(51) Int. Cl.
*H04L 12/28* (2006.01)
*H04W 48/16* (2009.01)
*H04W 8/00* (2009.01)

(52) U.S. Cl.
CPC .............. *H04W 48/16* (2013.01); *H04W 8/005* (2013.01)
USPC ........................................... 370/255; 370/328

(58) Field of Classification Search
CPC ................. H04L 41/12; H04L 45/02
USPC ................... 370/255, 328; 709/217
See application file for complete search history.

(56) References Cited

U.S. PATENT DOCUMENTS

2011/0183760 A1\*   7/2011   Kim et al. ...................... 463/40
2011/0207403 A1    8/2011   Kim et al.

(Continued)

FOREIGN PATENT DOCUMENTS

CN          101489300 A      7/2009
KR    10-2010-0050614 A      5/2010

(Continued)

OTHER PUBLICATIONS

Search Report issued in corresponding International Application No. PCT/KR2011/004096 dated Dec. 15, 2011.

(Continued)

*Primary Examiner* — Wanda Z Russell
(74) *Attorney, Agent, or Firm* — Morgan, Lewis & Bockius LLP

(57) ABSTRACT

The present invention provides, in one embodiment, a method for detecting another device performed by a first device having a converged personal network service (CPNS) enabled entity. The method for detecting another device comprises the steps of: performing a procedure for a physical connection with a second device, if the CPNS enabled entity within the first device is set to a personal network entity (PNE) mode; and receiving a search request message from the second device, in order to prevent the duplication of information between the CPNS enabled entity and the second device. Preferably, said search request message can be used to obtain one or more pieces of information, among the mode information of one or more devices detected while the procedure for the physical connection is performed and the information on a network to which one or more said detected devices belong. Said received search request message can include one or more pieces of information among the information on the mode of the second device and the information on the network to which the second device belongs.

6 Claims, 10 Drawing Sheets

(56) References Cited

U.S. PATENT DOCUMENTS

2011/0231547 A1* 9/2011 Yang et al. .................... 709/224
2011/0246605 A1* 10/2011 Yang et al. .................... 709/217

FOREIGN PATENT DOCUMENTS

KR    10-2010-0050620 A    5/2010
WO    2010/053241 A1    5/2010

OTHER PUBLICATIONS

Office Action dated Oct. 27, 2014, issued by the State Intellectual Property Office of China in Chinese Patent Application No. 201180037247.5.
Open Mobile Alliance "Converged Personal Network Service Requirements Candidate Version 1.0", Nov. 17, 2009.

* cited by examiner (a)

(b)

METHOD FOR ALLOWING ONE DEVICE TO DETECT ANOTHER DEVICE

TECHNICAL FIELD

The present invention relates to Converged Personal Network Service (CPNS).

BACKGROUND ART

Among a variety of developed technologies, conventional technologies such as Digital Living Network Alliance (DLNA) or ZigBee focus on mutual discover and use of services available from devices within a specific Personal Area Network (PAN), while tethering focuses on connectivity between heterogeneous networks.

Compared to such a simple PAN, the concept of CPNS has been proposed.

The CPNS allows access to services available from devices belonging to a Personal Network (PN) or PAN.

The CPNS is deployed through a CPNS server, a CPNS GateWay (GW), and CPNS-supporting devices. Besides, general servers and general devices may exist for the CPNS.

The CPNS is based on a PN. A group of devices form a PN, a CPNS GW is placed in the PN, and services of the devices belonging to the PN are registered to the CPNS server. Then a device that provides a specific service can be searched for in the CPNS server so that an external entity may share the service from the device.

The CPNS GW (also called PN GW) functions to connect the PN to another network. A CPNS device is also called a Personal Network Entity (PNE) which is a member of the PN. A group of devices may form a. PNE or a single device may be a PNE.

FIG. 1 is an exemplary view illustrating the concept of the CPNS.

General servers, CPNS servers, CPNS GWs, CPNS devices, and general devices are shown in FIG. 1.

Each CPNS server may communicate with one or more CPNS GWs (i.e. PN GWs) and thus may transmit data to or receive data from the CPNS GWs. The CPNS server may exchange data with one or more CPNS devices within a PN (or PAN) by communicating with them.

Each of the CPNS devices may transmit data to or receive data from one or more other CPNS devices or general devices through the CPNS GW.

The CPNS GW may transmit data to or receive data from a CPNS server, a CPNS GW within a different PN, or a CPNS device by communicating with the CPNS server, the CPNS GW, or the CPNS device.

Each CPNS server may transmit data to or receive data from a general server and a CPNS GW by communicating with them.

For example, the CPNS GW may communicate with the CPNS server over a cellular network and with a CPNS device by short-range communication, for example, Bluetooth, Near Field Communication (NFC), ZigBee, Wireless Fidelity (WiFi), etc.

The CPNS server can improve user experience by managing and controlling communication between the CPNS GW and a CPNS device and thus allowing exchange of applications and information between the CPNS GW and the CPNS device. For example, a user may acquire position information from another CPNS device (e.g. a Global Positioning System (GPS) device) through one CPNS device, transmit the position information to the CPNS server through the CPNS GW, and receive a location-based service from the CPNS server.

As a consequence, the user can receive various services through a plurality of CPNS devices within the PN.

DISCLOSURE

Technical Problem

The above-described conventional technology has merely introduced the concept of the CPNS, without providing a technical specification required to implement the CPNS.

Accordingly, an object of the present specification devised to solve the conventional problem is to provide a specific technology for implementing the CPNS. Another object of the present specification is to provide a physical connection (or pairing) procedure for establishing a physical connection between a plurality of CPNS devices or pairing them and a discovery procedure for mutually searching for the CPNS devices, first of all, in order to implement the CPNS.

Technical Solution

In an aspect of the present invention, a method for detecting another device in a first device having a Converged Personal Network Service (CPNS)-enabled entity includes receiving a discovery request message from a second device to prevent transmission of redundant information between the CPNS-enabled entity and the second device, after performing a physical connection procedure with the second device, if the CPNS-enabled entity of the first device is set to Personal Network Entity (PNE) mode. The discovery request message may be used to acquire at least one of information about mode of at least one device detected during the physical connection procedure and information about a network to which the detected at least one device belongs. The received discovery request message may include at least one of information about mode of the second device and information about a network to which the second device belongs.

The method may further include determining whether to transmit a discovery request message based on at least one piece of information included in the received discovery request message.

The method may further include transmitting a discovery response message including information about mode of the CPNS-enabled entity to the second device in response to reception of the discovery request message.

The discovery request message may be an Entity Discovery Request message or the discovery response message may be an Entity Discovery Response message.

The method may further include checking the information about the mode of the second device in the discovery request message.

If the information about the mode of the second device in the discovery request message indicates that the second device is a gateway, it may be determined not to transmit the discovery request message to the at least one device detected during the physical connection procedure.

If the discovery request message includes the information about the network to which the second device belongs, the CPNS-enabled entity may be allowed to join the network.

If the discovery request message does not include the information about the network to which the second device belongs, the CPNS-enabled entity may be allowed to generate a network.

If the discovery request message does not include the information about the network to which the second device belongs and it is inappropriate for the CPNS-enabled entity to join the network to which the second device belongs, the CPNS-enabled entity may be allowed to generate a network.

The method may further include determining whether the CPNS-enabled entity is set to the PNE mode, after performing the physical connection procedure with the second device, and performing a physical connection procedure with the second device and then awaiting reception of the discovery request message, if the CPNS-enabled entity is set to the PNE mode.

The method may further include starting to generate the discovery request message, if the discovery request message is not received for a predetermined time, and discontinuing generation or transmission of the discovery request message, upon receipt of the discovery request message from the second device during generation of the discovery request message.

The method may further include transmitting a registration request message to the second device so that the registration request message is transmitted to a server and transmitting additional information needed for physical connections to other devices to the second device so that the additional information is transmitted to the server, receiving information valid only between the CPNS-enabled entity and the server, and completing the physical connection procedure by transmitting the information valid only between the CPNS-enabled entity and the server to another device, if the first device searches for a physically connectable another device.

In another aspect of the present invention, a device includes a memory for storing a CPNS-enabled entity and a transceiver for receiving a discovery request message, from a second device to prevent transmission of redundant information between the CPNS-enabled entity and the second device, after performing a physical connection procedure with the second device, if the CPNS-enabled entity of the first device is set to PNE mode. The discovery request message may be used to acquire at least one of information about mode of at least one device detected during the physical connection procedure and information about a network to which the detected at least one device belongs. The received discovery request message may include at least one of information about mode of the second device and information about a network to which the second device belongs. The device may further include a processor for determining whether to transmit a discovery request message based on at least one piece of information included in the received discovery request message.

Effects of the Invention

An embodiment of the present invention solve the aforedescribed problems of the conventional art. That is, an embodiment of the present invention provide a specific technology to implement the CPNS. In addition, an embodiment of the present invention increase user convenience and prevent resource waste by simplifying a procedure for establishing a physical connection (or pairing) between a plurality of CPNS devices and a procedure for mutually searching for the CPNS devices between them, in order to implement the CPNS.

BRIEF DESCRIPTIONS OF THE DRAWINGS

EMBODIMENTS FOR CARRYING OUT THE INVENTION

Figure 1:
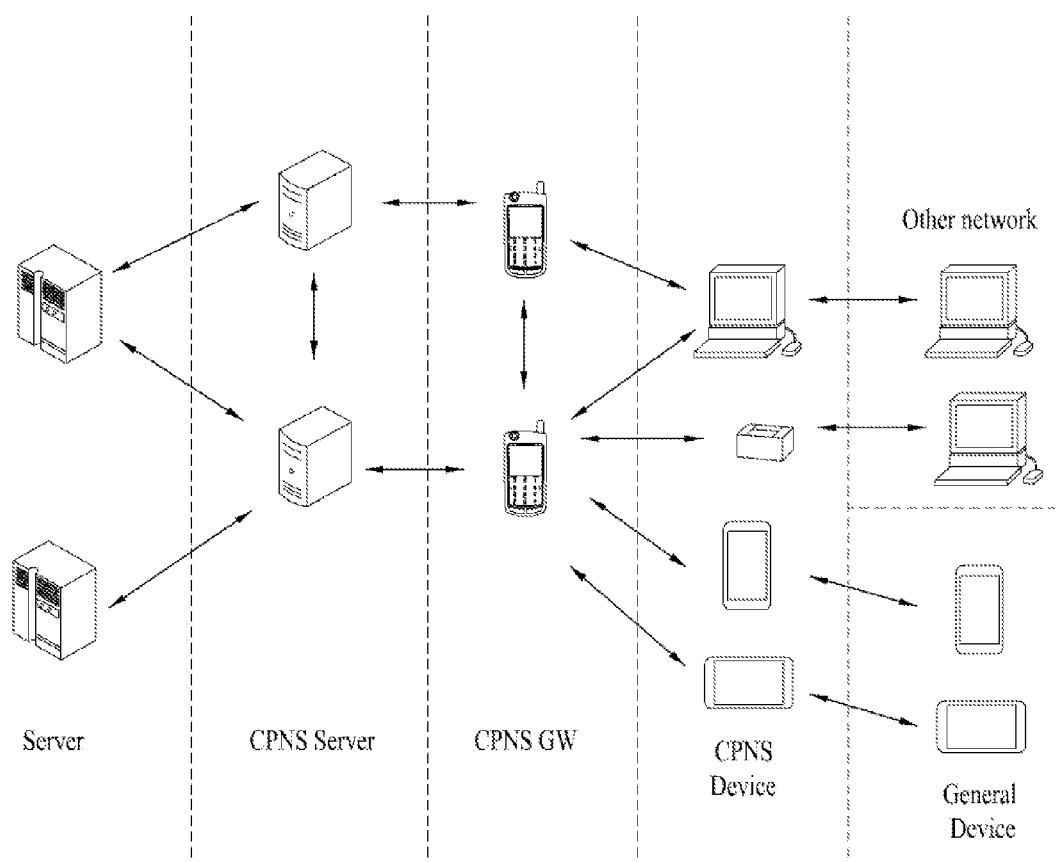
FIG. 1 is an exemplary view illustrating the concept of Converged Personal Network Service (CPNS)

The present invention relates to Converged Personal Network Service (CPNS). Yet, the present invention should not be construed as limited to it, rather, the present invention can be used for all communication systems and methods to which the technical spirit of the present invention can be applied, and other systems.

The technical terms used in the present invention are provided simply to describe specific embodiments, not intended to restrict the present invention. Unless otherwise defined all the technical terms used herein have the same meaning as terms generally understood by those skilled in the art. The terms should be interpreted as neither excessively comprehensive meanings nor excessively narrow meanings, if technical terms used in the specification are too wrongly chosen to accurately express the subject matter of the present invention, the should be replaced with ones readily understood to those skilled in the art. In addition, general terms used herein should be understood so as to have the same meanings as defined in a general dictionary or as contextual meanings of the related art. The terms should not be interpreted as excessively narrow meanings.

Herein, singular expressions include plural expressions unless otherwise clarified in the context. In this description, the term "include" or "have" is not interpreted as necessarily including all of the components or steps described in the specification. Rather, it should be understood that there are possibilities of omitting or adding one or more components or steps.

While ordinal numbers like first, second, etc. can be used to describe a number of components, these components are not limited by the terms. The terms are used to distinguish one component from other components. For example, a first component may be referred to as a second component or vice versa within the scope and spirit of the present invention.

When it is said that one component is "connected" or "linked" to another component, they may be connected or linked directly or with a third component in between. On the other hand, if it is clarified that one component is "directly connected" or "directly linked" to another component, it should be understood that a third component is not interposed between the components.

Reference will now be made to preferred embodiments of the present invention with reference to the attached drawings. Like reference numerals denote the same or similar components and redundant descriptions of the components are avoided. A detailed description of Blown technologies will be omitted lest it should obscure the subject matter of the present invention. In addition, the attached drawings are provided to help easy understanding of the subject matter of the present invention, not limiting the present invention. The spirit of the present invention should be interpreted as expanding to all variations, equivalents, and replacements besides the attached drawings.

The term terminal used in the drawings may be replaced with User Equipment (UE), Mobile Equipment (ME), Mobile Station (MS), User Terminal (UT), Subscriber Station (SS), wireless device, handheld device, or Access Terminal (AT). The terminal may be a portable device having a communication function such as a portable phone, a Personal Digital Assistant (PDA), a smart phone, a wireless modem, a laptop computer, etc. or a non-portable device such as a PC or an in-vehicle device.

Definitions of Terms

With reference to the drawings, terms used in the present invention will be defined in brief to help understanding of the present invention.

1) CPNS: CPNS allows access to services available from devices that form a Personal Network (PN) (or Personal Area Network (PAN)). Compared to tethering that allows an Internet-connected device to assign a private Internet Protocol (IP) address to another device by Network Address Translation (NAT) so that the device may access the Internet using the private IP address, the CPNS allows a first device of a user to integrally manage various services that can be provided over a mobile communication network, beyond simple allocation of a private IP address to another device. Since the first device of the user manages services in an integrated manner, services can be shared seamlessly among a plurality of devices of the user. For example, the first device may transfer an on-going Video on Demand (VoD) file seamlessly to a second device, thereby increasing user convenience. In addition, in the case where the user has a plurality of devices, when an external server is to transmit service data to the user without a request of the user, the external server may select a device to receive the service data from among the plurality of devices. For example, if the user has a plurality of devices capable of conducting a video call, upon receipt of a video call request for the user, a device to receive a video call may be determined among the plurality of devices. The on-going video call may also be transmitted to another device of the user. This CPNS is implemented by a CPNS-enabled entity provided at a device of the user.

2) CPNS-enabled entity: A CPNS-enabled entity is a logical entity and there are three types of CPNS-enabled entities: Personal Network Entity (PNE), Personal Network GateWay (PN GW), and CPNS server. The CPNS server is located within a core network and the PNE and PN GW are located within a CPNS device.

3) CPNS device: A CPNS device is a device that can operate simultaneously in a plurality of modes in a PN. The CPNS device is equipped with a function of processing, storing, and reproducing contents. In addition, the CPNS device may have communication interfaces so that different CPNS devices may operate in different modes in a PN.

4) CPNS server: A CPNS server is a functional entity that can provide resources to CPNS entities in response to a request or in a push fashion. The CPNS server registers services related to devices and a user, stores corresponding information, and provides registration of a PN being a group of devices and registration of a service group including a PN and a Wireless Access Network (WAN). The CPNS server may also communicate with external entities such as a content server. The CPNS server is an entity that sets a key for authenticating a device of the user in order to implement a service on a CPNS framework. In addition, the CPNS server registers external services and supports a search and consumption/provision request, for consumption at a device.

5) PN (Personal Network): A PN is a set of devices that enable a user to consume: or generate services. All devices of the PN may be connected to a PN GW. The PN may change with the passage of time. The PN may include at least a device operating in GW mode and another device operating in PNE mode.

6) PNE: PNE is an abbreviation of Personal Network Element. A PNE is a member of a PN. The PNE may consume or provide a service or content. The PNE: is an entity that actually consumes contents, applications, and services. In addition, the PNE is a member of a PN or a service group that is created in the CPNS framework.

7) PN GW: PN GW is an abbreviation of Personal Network Gateway. A PN GW is an entity that is located in a PN and a wide area network (WAN) and can form a PN to provide the CPNS. The PN GW takes charge of connectivity between heterogeneous networks, for a device for which an external connection is impossible, while located in the PN, and manages an inventory and registration of connected devices to a CPNS server.

A PN GW in a device allows other devices as well as a PNE located in a PN to be connected to a CPNS server. The PN GW of the device uses a global network such as a mobile network. The PN GW also manages services with PNEs and manages communication and other functional information.

8) PN Inventory: A PN inventory is a list of PNs and devices belonging to the PNs.

9) Service Group: A service group is a set of PNEs and PN GWs that share services, data, and applications. That is, the service group is a set of devices registered to a server through a created PN. Devices being the members of the service group are not necessarily dependent on one PN and may not belong to the same user. Rather, the service group may include all devices that are distributed in different PNs and thus cannot be connected to one another.

10) Zone: A zone is a certain geographical area.

11) Zoned based service: A zone based service means a CPNS provided within the zone-based coverage of a PN GW.

12) Zone PN GW: A PN GW that provides a unique service or content within a zone.

13) CPNS-enabled entity mode: A CPNS device may operate in PN GW mode and PNE mode. The modes may be identified by devices using a CPNS entity discovery function. A PN should include at least a device operating as a PN GW and a device operating as a PNE. Each of the PNE and the PN GW should know the other's mode in order to form a PN or join a PN. The PN GW should be able to identify the PNE to create a PN member. The PNE should identify the PN GW to form a new PN or join an existing PN.

A device supporting the PNE mode only (e.g. an MP3 player or a smart meter) operates only in the PNE mode. If a device can operate only as a PN GW, the device operates only as a PN GW. However, when a device can operate as either a PN GW or a PNE the device may operate in one of the two modes according to a pre-stored setting value and the mode may be changed according to a user setting or a service provider setting.

Figure 2:
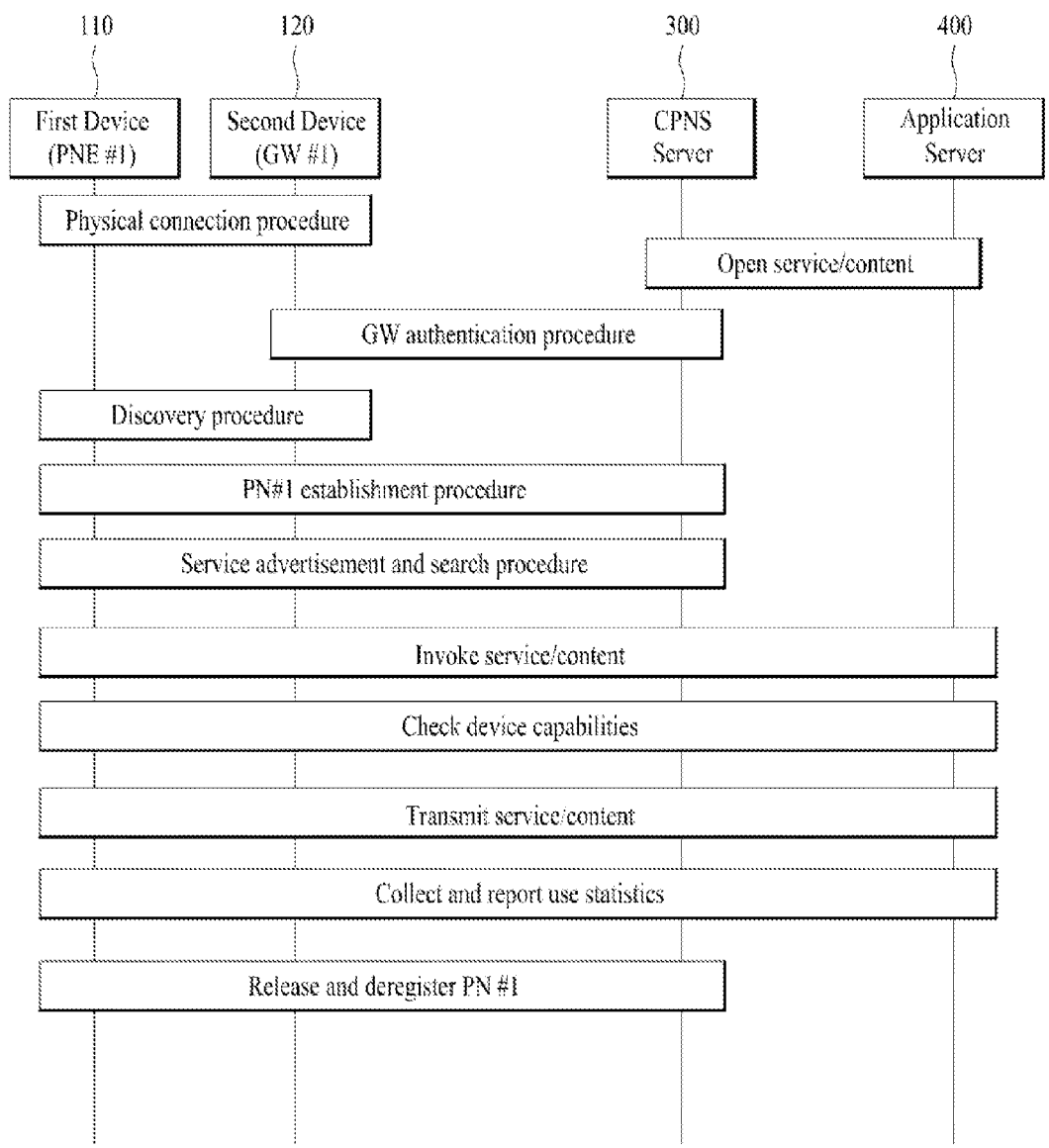
FIG. 2 is an exemplary view illustrating an overall CPNS procedure.

FIG. 2 is an exemplary view illustrating an overall CPNS procedure.

A first device 110, a second device 120, a CPNS server 300, and an application server 400 are shown in FIG. 2.

User A owns the first and second devices 110 and 120. The first device 110 is a cellular phone of User A that may have a first transceiver to connect to the CPNS server 300 through a mobile communication network. To form a PN, the first device 100 may have a second transceiver operating in conformance to, for example, Bluetooth, WiFi, or ZigBee. The second device 120 is a portable multimedia device of User A which has only a second transceiver operating in conformance to, for example. Bluetooth, WiFi, or ZigBee to form a PN, without a first transceiver used for communicating with the mobile communication network.

The first and second devices 110 and 120 may have CPNS-enabled entities. Each CPNS-enabled entity may operate in GW mode or PNE mode. By way of an example, the second device 120 is shown in FIG. 2 as operating as a. GW because it has the first transceiver connectable to the mobile communication network.

If the first and second devices 110 and 120 are adjacent to each other, they perform a physical connection procedure through the second transceivers. Meanwhile, the application server 400 registers services and contents to the CPNS server 300 or advertises the services and contents. Further, the CPNS server 300 performs an authentication process for the second device 120 operating as a GW.

Upon completion of the physical connection procedure between the first and second devices 110 and 120, each CPNS-enabled entity discovers the other CPNS-enabled entity.

Upon completion of the discovery, the devices establish a first PN (PN #1). Information about PN #1 is registered to the CPNS server 300.

When PN #1 is completely established, the CPNS server 300 advertises its preserved services to the devices of PN #1 or searches for services available from the devices of PN #1.

If a device of PN #1 invokes a service or contents from among the advertised services, the capabilities of the device are checked and a service or content is provided to the device according to the checked capabilities.

When the device uses the service or contents, the use statistics of the service or contents are collected and reported to the CPNS server 300 or the application server 400.

If PN #1 is not needed any longer, PN #1 may be released and the information about PN #1 may be deregistered from the CPNS server 300.

Figure 3:
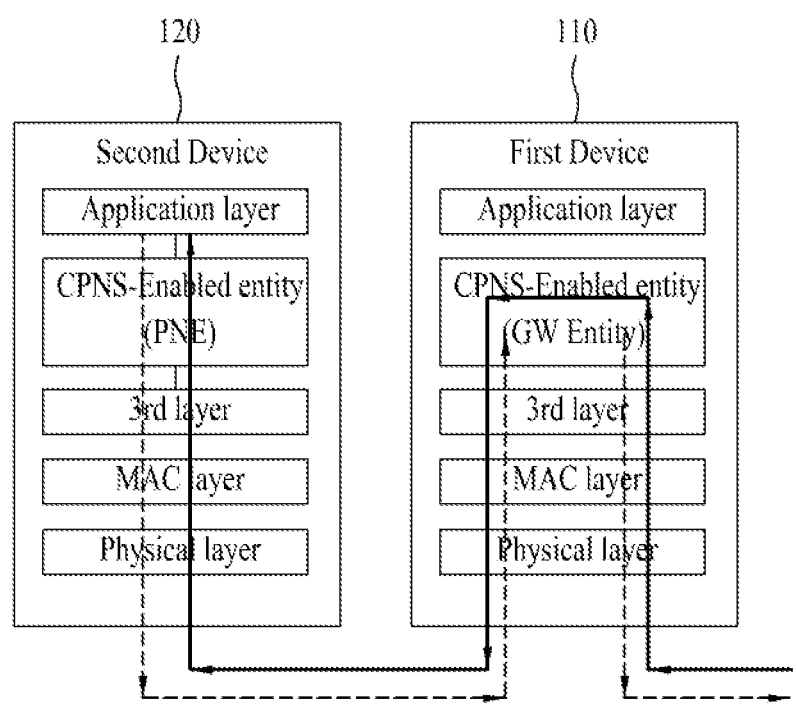
FIG. 3 illustrates the architecture of first and second devices illustrated in FIG. 2.

FIG. 3 illustrates the architecture of the first and second devices illustrated in FIG. 2.

Referring to FIG. 3, there are a physical layer, a Medium Access Control (MAC) layer, a $3^{rd}$ layer, a CPNS-enabled entity, and an application layer in each of the first and second devices 110 and 120. The CPNS-enabled entity of the second device 120 is activated in the PNE mode and the CPNS-enabled entity of the first device 110 activates only a GW entity. On the other hand, the CPNS-enabled entity of the first device 110 activates a GW entity.

Figure 4:
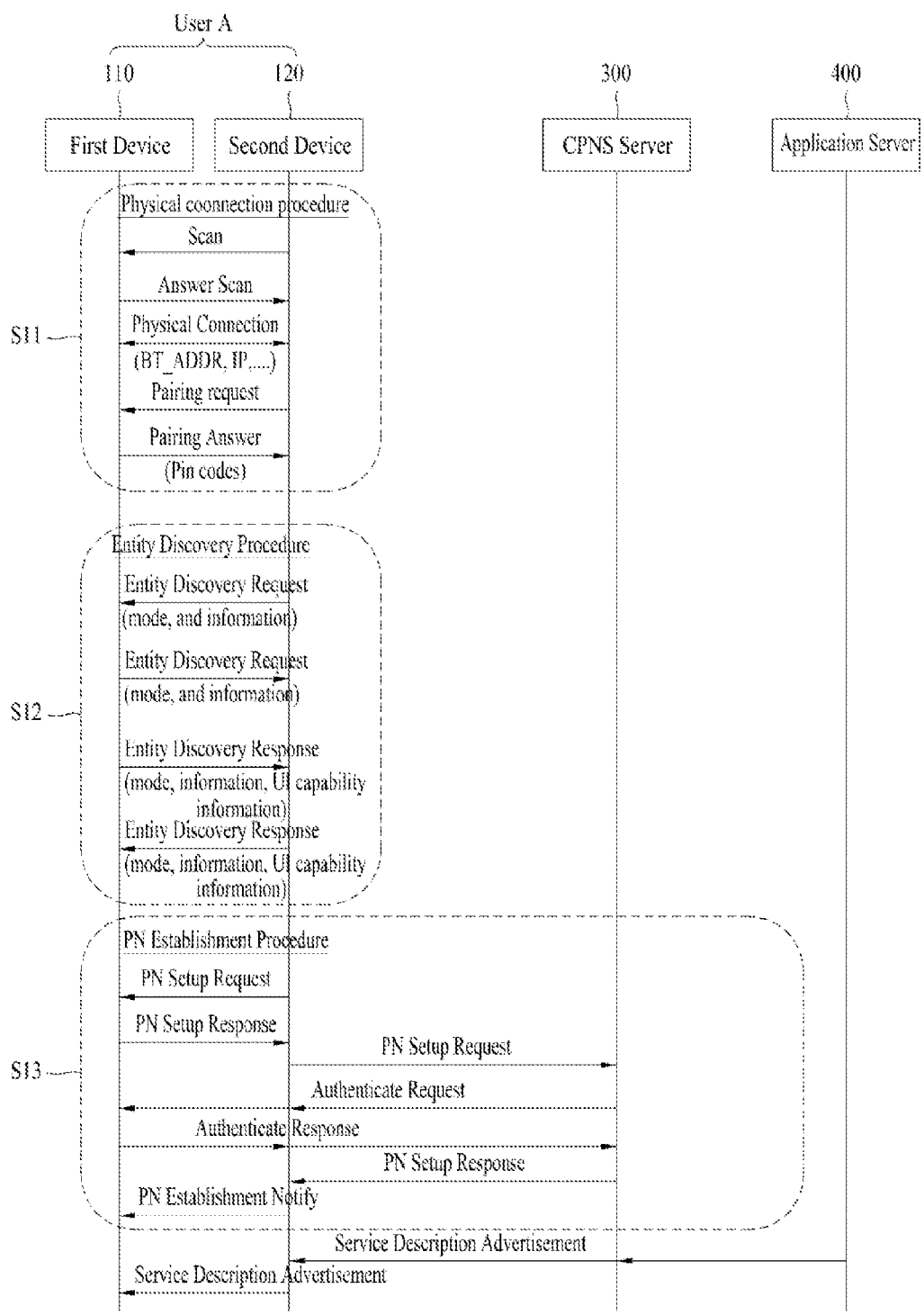
FIG. 4 is an exemplary view illustrating an initialization procedure of CPNS.

Accordingly, as indicated by a bold solid line in FIG. 4, service data is transferred to the GW entity of the CPNS-enabled entity through the physical layer, the MAC layer, and the $3^{rd}$ layer in the first device 110. Upon receipt of the service data, the GW entity of the first device 110 transmits the service data to the second device 120 through the CPNS-enabled entity, the $3^{rd}$ layer, the MAC layer, and the physical layer.

The PNE of the CPNS-enabled entity receives the service data through the physical layer, the MAC layer, and the $3^{rd}$ layer in the second device 120.

Meanwhile, the PNE of the CPNS-enabled entity in the second device 120 transmits a control message such as a request message or a response message to the first device 110 through the $3^{rd}$ layer, the MAC layer, and the physical layer.

FIG. 4 is an exemplary view illustrating an initialization procedure of CPNS.

Referring to FIG. 4, a pairing procedure corresponding to a physical connection procedure (S11), an entity discovery procedure (S12), and a PN establishment procedure (S13) are performed.

In the pairing procedure (S11), with no connection established between the devices of User A, the physical connection procedure is initiated between the devices.

To initiate the physical connection procedure, the second device 120 starts to scan. In order to scan, the second device 120 may transmit a Scan message to the first device 110. The first device 110 may reply to the second device 120 with an Answer Scan message. Thus, the physical connection procedure is initiated between the first and second devices 110 and 120 and information for the physical connection, for example, addresses or IP addresses are exchanged between the first and second devices 110 and 120. After the information is exchanged, the second device 120 transmits a physical connection request message, for example, a Pairing Request message to the first device 110. The first device 110 receives a Personal Identification Number (PIN) code from the user and transmits the PIN code in a physical connection response message, for example, a Pairing Answer message to the second device 120. If the PIN code is correct, the physical connection procedure is completed.

Upon completion of the physical connection procedure, the CPNS-enabled entity of each device performs a procedure to discover the other, that is, the entity discovery procedure (S12).

Specifically, the CPNS-enabled entity of the second device 120 transmits a discovery request message, for example, an Entity Discovery Request message to the first device 110. The discovery request message, for example, the Entity Discovery Request message includes information about the mode of the CPNS-enabled entity of the second device 120 and information about the CPNS-enabled entity and already discovered other devices. If the CPNS-enabled entity of the second device 120 is set as a GW, the mode information may include information indicating the CPNS-enabled entity is the GW.

The CPNS-enabled entity of the first device 110 also transmits a discovery request message, for example, an Entity Discovery Request message to the second device 120. The discovery request message, for example, the Entity Discovery Request message includes information about the mode of the CPNS-enabled entity of the first device 110, information about the CPNS-enabled entity and other devices previously discovered. If the CPNS-enabled entity of the first device 110 is set as a PNE the mode information may include information indicating the PNE.

The CPNS-enabled entity of the first device 110 transmits a discovery response message, for example, an Entity Discovery Response message to the second device 120 in response to the discovery request message, for example, the Entity Discovery Request message. The discovery response message, for example, the Entity Discovery Response message includes the mode information, the information about the CPNS-enabled entity and the other devices previously discovered, and information about UI functions.

Likewise, the CPNS-enabled entity of the second device 120 transmits a discovery response message, for example, an Entity Discovery Response message to the first device 110 in response to the discovery request message, for example, the Entity Discovery Request message.

When the discovery procedure is completed by exchanging the above messages between the first and second devices 110 and 120, the PN establishment procedure (S13) is performed.

Specifically, if the CPNS-enabled entity of the second device 120 is set as a GW, the second device 120 transmits a PN setup request message, for example, a PN Setup Request message to a device set as a PNE for example, the first device 110. The PN Setup Request message may include information about the GW and information about entities (e.g. the CPNS-enabled entity of the first device) that will belong to the PN to be created.

Upon receipt of a PN setup response message, for example, a PN Setup Response message from the CPNS-enabled entity of the first device 110, the CPNS-enabled entity of the second device 120 transmits a PN Setup Request message to the CPNS server 300.

Upon receipt of the PN Setup Request message, the CPNS server 300 transmits an authentication request message, for example, an Authenticate Request message to the first device 110 through the second device 120 operating as the GW. The first device 110 transmits an authentication response message, for example, an Authenticate Response message to the CPNS server 300 through the second device 120 in response to the Authenticate Request message.

Upon receipt of the Authenticate Response message, the CPNS server 300 transmits a PN Setup Response message to the second device 120 operating as the GW.

Then the CPNS-enabled entity of the second device 120 operating as the GW transmits a PN setup completion notification message, for example, a PN Establishment Notify message to the first device 110.

When the PN establishment is completed by exchanging the above-described messages, the application server 400 such as a content server may transmit a Service Description Advertisement message including information about its services to the second device 120 operating as the GW through the CPNS server 300. Then, the second device 120 which is the GW transmits the Service Description Advertisement message to the devices of the PN managed by the second device 120.

Figure 5:
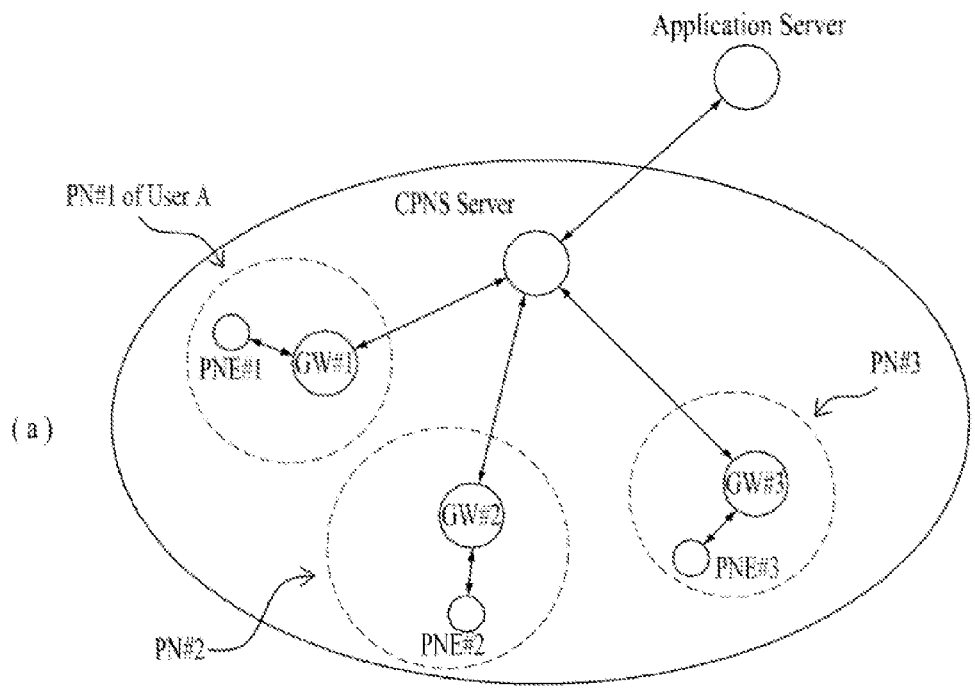
FIG. 5 illustrates an example in which the Personal Network (PN) of User A overlaps with another PN clue to geographical movement of User A.
Figure 5:
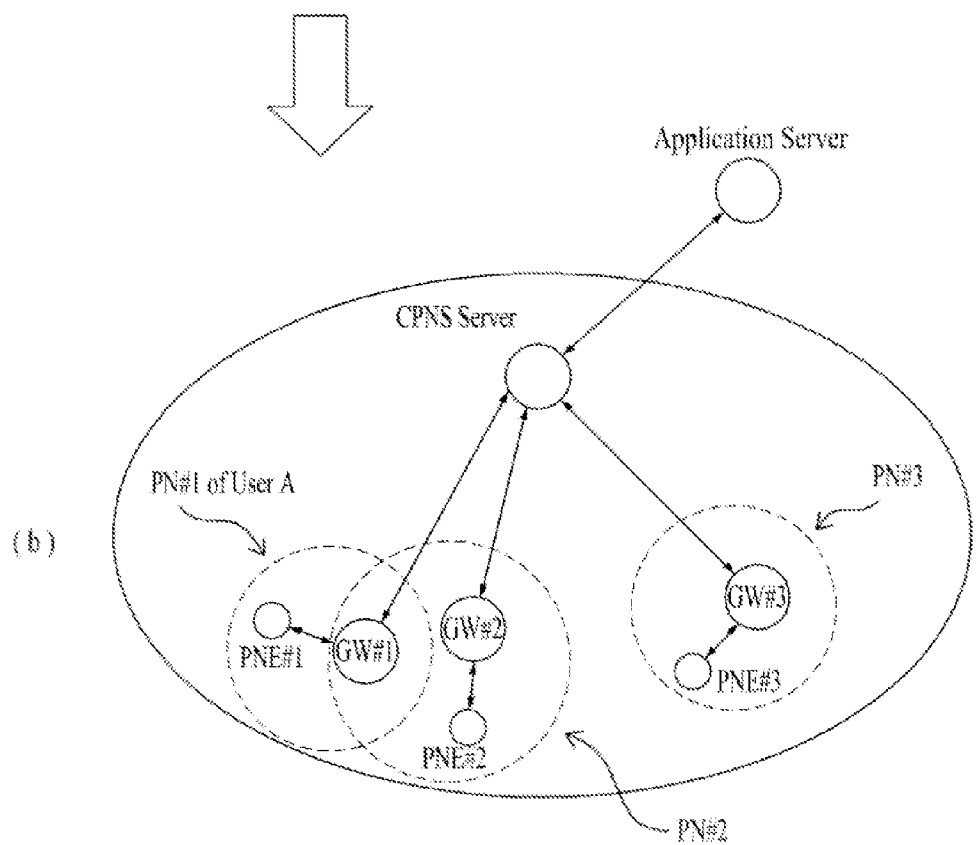
Figure 6:
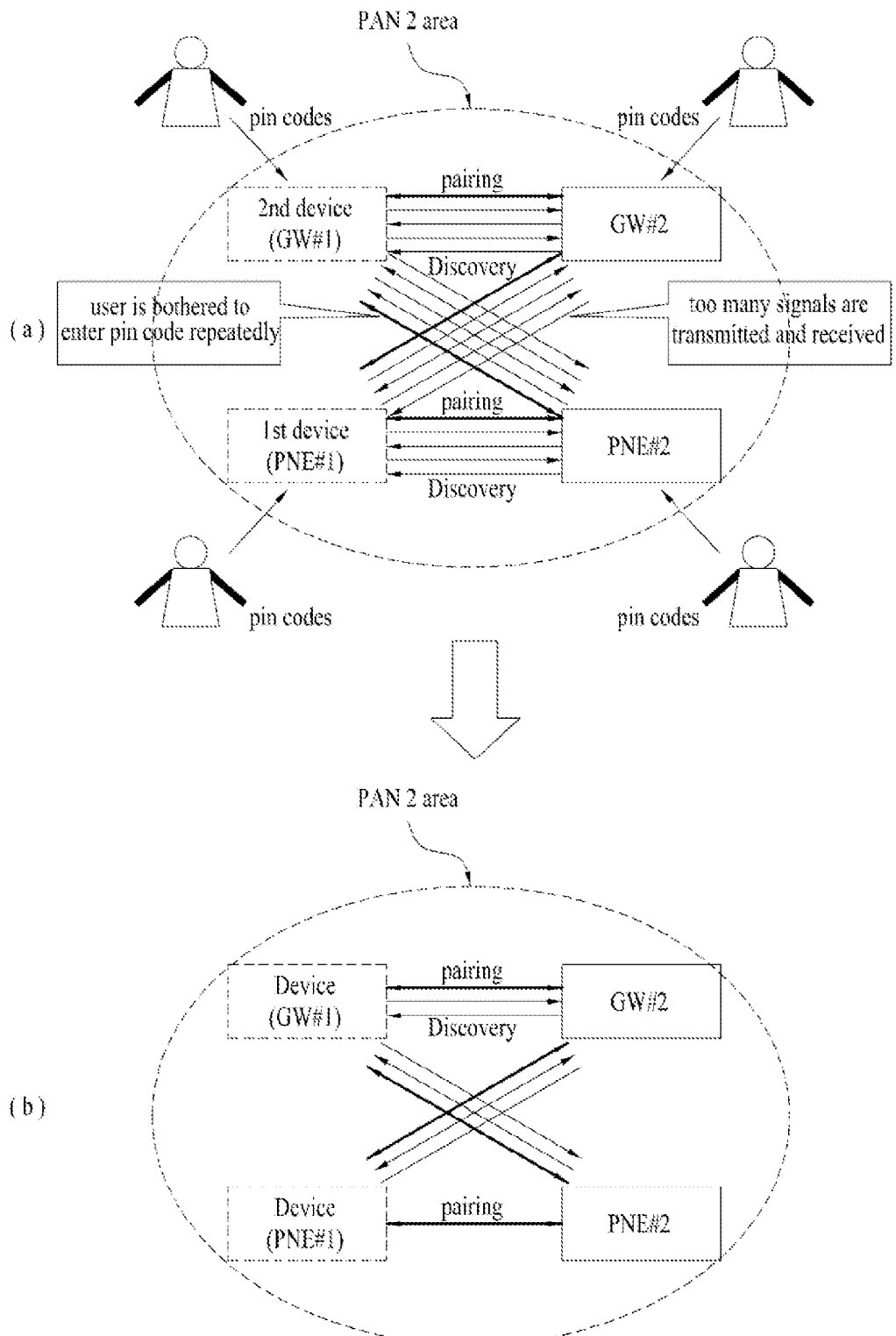
FIG. 6 is an exemplary diagram illustrating a signal flow for a physical connection procedure and a discovery procedure, which are triggered in the example of FIG. 4.

FIG. 5 illustrates an example in which the PN of User A overlaps with another PN due to geographical movement of User A and FIG. 6 is an exemplary diagram illustrating a signal flow of a physical connection procedure and a discovery procedure, which are triggered in the example of FIG. 4.

In FIG. 5(a), three PNs, a CPNS server, and an application server are shown, by way of example. Among the three PNs, PN #1 was created by User A. PN #1 includes devices of User A, for example, a first GW (GW #1) and a first PNE (PNE #1), as illustrated in FIG. 5(a). It is assumed that GW #1 is a cellular phone of User A and PNE #1 is a portable multimedia device of User A. A second PN (PN #2) includes a second GW (GW #2) and a second PNE (PNE #2) and a third PN (PN #3) includes a third GW (GW #3) and a third PNE (PNE #3). The application server may provide a service to the PNEs of each PN through the CPNS server and GW #1, GW #2, and GW #3.

Referring to FIG. 5(b), it is assumed that User A geographically has moved into the coverage of PN #2, carrying GW #1 and PNE #1.

Then, PN #1 formed by GW #1 and PNE #1 of User A overlaps with PN #2. That is, GW #1 and PNE #1 belonging to PN #1 of User A are included in the coverage of PN #2.

When GW #1 and PNE #1 belonging to PN #1 of User A are included in the coverage of PN #2 as described above, a pairing procedure and an entity discovery procedure are performed again, as illustrated in FIG. 6(a).

Specifically, as illustrated in FIG. 6(a), each of the first and second devices of User A performs the pairing procedure and the discovery procedure with GW #2. To perform the pairing procedure, User A should enter a PIN code a plurality of times although irritating. In addition, four signals are transmitted and received during the discovery procedure, as illustrated in FIG. 4. Considering the discovery procedure is performed four times in total, as many as 16 messages are transmitted and received, which increases complexity.

Accordingly, the pairing procedure needs to be automated without user interaction, as illustrated in FIG. 6(b). Further, there exists a need to simplify the discovery procedure.

Figure 7:
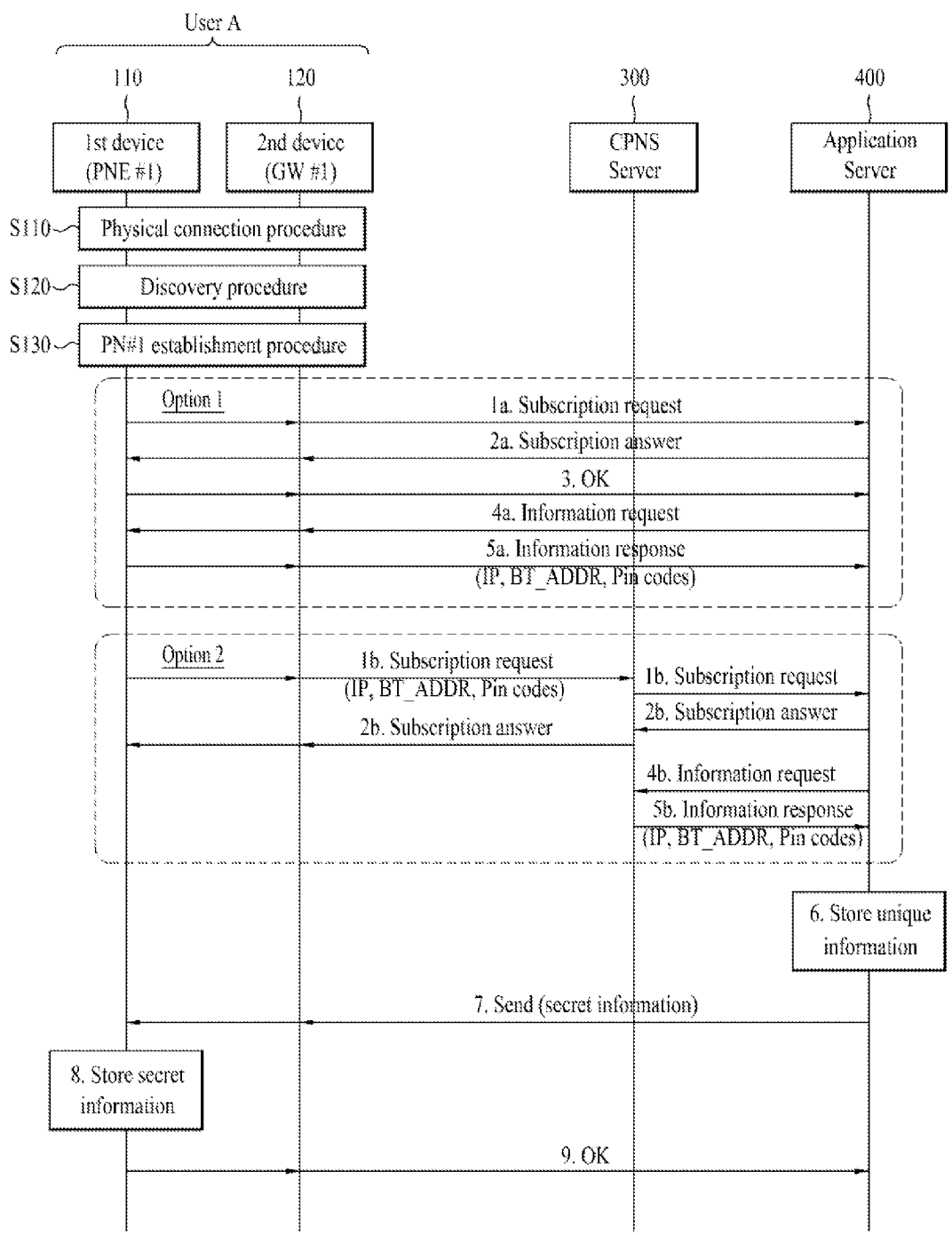
FIGS. 7 and 8 illustrate a method for simplifying a physical connection procedure according to an embodiment of the present invention.
Figure 8:
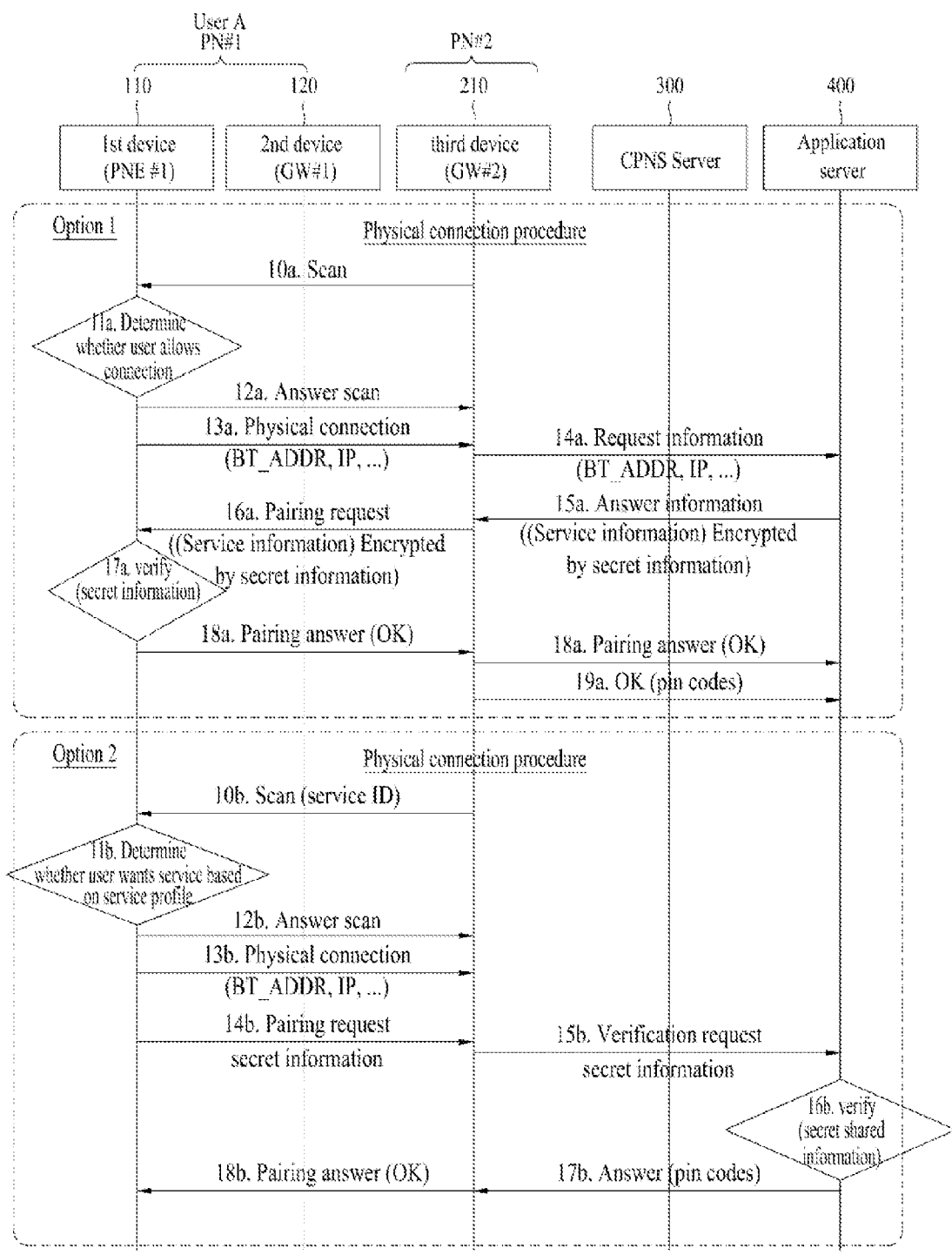
Figure 9:
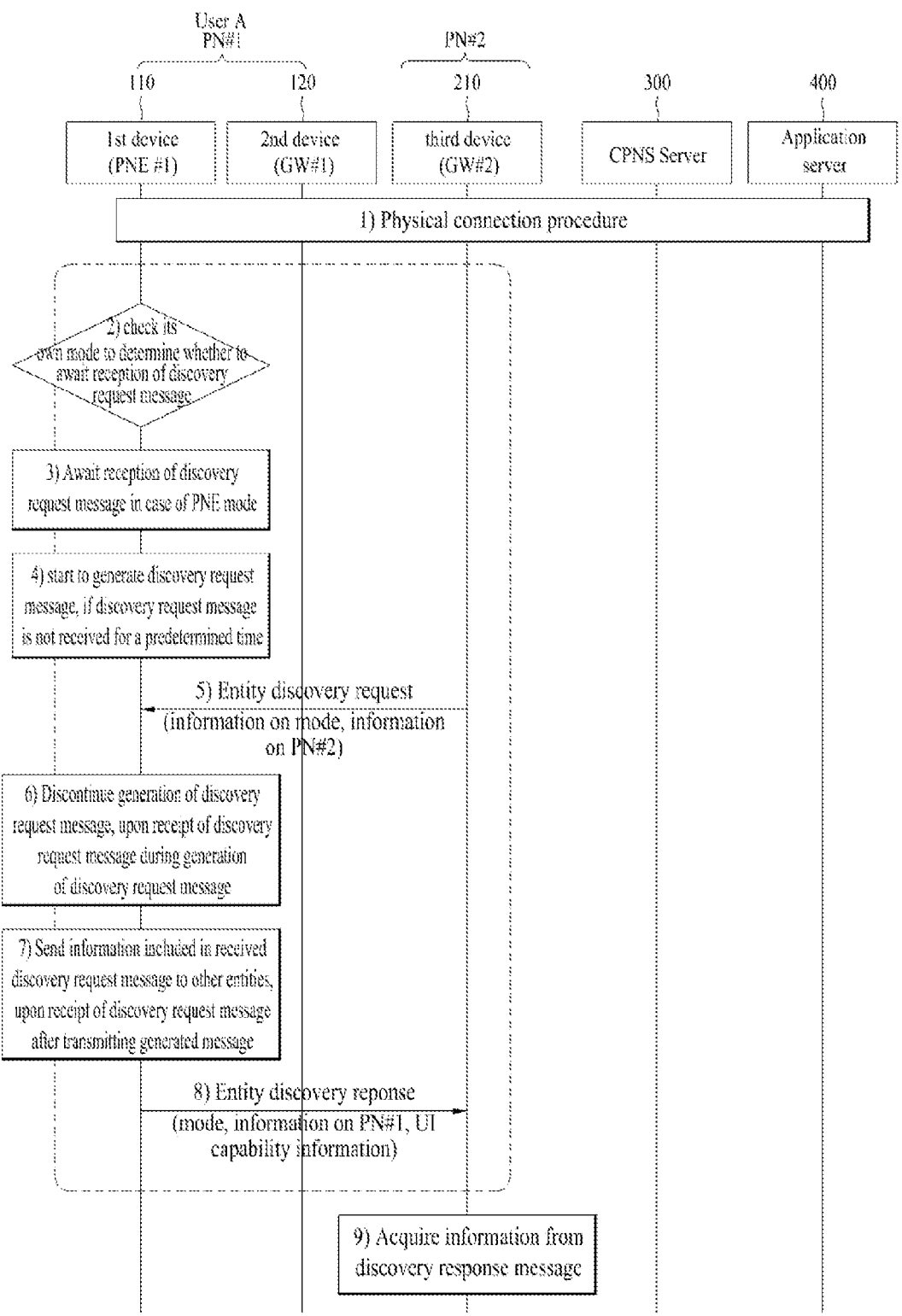
FIG. 9 illustrates a method for simplifying the discovery procedure illustrated in FIG. 6 according to another embodiment of the present invention.

With reference to FIGS. 7, 8 and 9, a method for simplifying the pairing procedure and the discovery procedure will be described below.

FIGS. 7 and 8 illustrate a method for simplifying the physical connection procedure according to a first embodiment of the present invention.

As noted from FIGS. 7 and 8, the first embodiment is characterized in that after a physical connection is established, unique information is transmitted to an entity within a network, for example, the CPNS server 300 or the application server 400 so that a physical connection is established automatically without interaction with a user such as entering a PIN code dining a later physical connection procedure. In FIG. 7, two options (or examples) are given to transmit the unique information to the network entity, for example, the CPNS server or the application server. One option is to transmit the unique information to the application server 400 and the other option is to transmit the unique information to the CPNS server 300.

Specifically, as noted from FIG. 7, User A owns the first device 110 operating as a PNE and the second device 120 operating as a GW. It is assumed herein that the first device 110 is a portable multimedia device and the second device 120 is a cellular phone.

If the first and second devices 110 and 120 are adjacent each other, a physical connection procedure is performed (S110). Subsequently, the first and second devices 110 and 120 perform a mutual discover procedure (S120) and then a PN establishment procedure (S130).

1~5) According to the afore-mentioned first option, the CPNS-enabled entity of the first device 110 transmits a Subscription Request message to the application server 400 through the second device 120 operating as the GW. The application server 400 transmits a Subscription Answer message to the first device 110 through the second device 120 operating as the GW. The first device 110 transmits a response message, for example, an OK message to the application server 400 through the second device 120. Subsequently, the application server 400 transmits an Information Request message to the first device 110 through the second device 120. The first device 110 transmits an Information Response message including unique information needed for a later automatic setup of a physical connection, for example, at least one of a physical address, an IP address, and a PIN code to the application server 400 in response to the Information Request message.

According to the afore-mentioned second option, the CPNS-enabled entity of the first device 110 transmits a Subscription Request message to the CPNS server 300 through the second device 120 operating as the GW. The Subscription Request message includes unique information needed for a later automatic setup of a physical connection, for example, at least one of a physical address, an IP address, and a PIN code.

The CPNS server 300 transmits a Subscription Request message to the application server 400 based on the received Subscription Request message. The Subscription Request message transmitted by the CPNS server 300 may not include the unique information received from the first device 110. The application server 400 transmits a Subscription Answer message to the CPNS server 300 and the CPNS server 300 transmits a Subscription Answer message to the first device 110 through the second device 120 operating as the GW, based on the received Subscription Answer message. If the Subscription Request message transmitted by the CPNS server 300 does not include the unique information received from the first device 110 as described above, the application server 400 transmits an Information Request message to the CPNS server 300 and the CPNS server 300 transmits an Information Response message including the unique information received from the first device 110 to the application server 400.

6) When the application server 400 acquires the unique information about the first device 110 in the above two options, it stores the unique information.

7~8) The application server 400 transmits to the first device 110 secret information valid only between the first device 110 and the application server 400 through the second device 140. The secret information may be encrypted by a unique key of the first device, e.g., a public key.

9) The first device 110 stores the secret information and transmits a response message to the application server 400 through the second device 120.

Referring to FIG. 8, it is assumed that UE A has geographically moved into the coverage of PN#2 carrying the first device 110, i.e. PNE #1 and the second device 120, i.e. GW #1.

Then, PN #1 formed by GW #1 and PNE #1 of User A overlaps with PN #2. That is, GW #1 and PNE #1 belonging to PN #1 of User A are included in the coverage of PN #2.

When GW #1 and PNE #1 belonging to PN #1 of User A are included in the coverage of PN #2 as described above, a third device 210 operating as a GW in PN #2 i.e. GW #2 attempts to establish a physical connection. Regarding an automatic physical connection procedure without a user's entering a PIN code, two options (examples) are given in FIG. 8 as follows.

10~19) According to the first option (or example), the third device 210 operating as a GW in PN #2 transmits a Scan message to the first device 110. Then the first device 110 determines whether the user allows a new physical connection. If a new physical connection is allowed, the first device 110 transmits an Answer Scan message to the third device 210 operating as the GW. Thus the physical connection is initiated and information needed for a physical connection, for example, addresses, IP addresses, etc. are exchanged between the first device 110 and the third device 210 operating as the GW. The third device 210 operating as the GW transmits a Request Information message including the information needed for the physical connection to the application server 400. Upon receipt of the information needed for the physical connection, the application server 400 compares the received information needed for the physical connection with stored information. If the received information is identical to the stored information, the application server 400 searches for secret information matching to the information needed for the physical connection. The application server 400 encrypts the detected secret information by secret information of the first device 110, for example, a public key or an Identifier (ID) of the first device 110 and transmits an Answer Information message including the encrypted secret information to the third device 210 operating as the GW. The third device 210 operating as the GW transmits a physical connection request message including the encrypted secret information, for example, a Pairing Request message to the first device 110. Then the first device 110 extracts the encrypted secret information from the physical connection request message, decrypts the encrypted secret information, and verifies the decrypted secret information. If the decrypted secret information turns out to be valid, the first device 110 transmits a physical connection response message, for example, a Pairing Answer message to the third device 210 operating as the GW. The third device 210 operating as the GW transmits the physical connection response message to the application server 400. Then, the application server 400 transmits a response message including the PIN code of the first device 110 to the third device 210 operating as the GW in response to reception of the physical connection response message. The third device 210 operating as the GW transmits a physical connection response message to the first device 110 based on the PIN code of the received response message in order to complete the physical connection procedure.

According to the second option (or example), the GW of PN #2, i.e., GW #2 transmits a Scan message to the first device 110. The Scan message includes the ID of a service available from PN #2. The first device 110 determines based on the ID of the service whether the user wants to receive the service. If the service is allowed, the first device 110 transmits an Answer Scan message to the third device 210 operating as the GW. Thus, the physical connection is initiated and information needed for a physical connection, for example, addresses, IP addresses, etc. are exchanged between the first device 110 and the third device 210 operating as the GW. Instead of receiving a PIN code from the user, the first device 110 may transmit a physical connection request message, for example, a Pairing Request message including secret information valid only between the first device 110 and the application server 400 to the third device 210 operating as the GW. Then, the third device 210 operating as the GW transmits a Verification Request message including the secret information to the application server 400. The application server 400 verifies the secret information. If the secret information turns out to be valid, the application server 400 transmits a response message including the PIN code of the first device 110, for example, an Answer message to the third device 210 operating as the GW. The third device 210 operating as the GW transmits a physical connection response message to the first device 110 based on the PIN code of the received response message in order to complete the physical connection procedure.

As described above, when the first device. PNE #1 belonging to the first network PN #1 of User A is included in the coverage of the second network PN#2, a physical connection procedure is performed automatically without User A's entering a PIN code in the first embodiment. Therefore, user inconvenience is mitigated.

FIG. 9 illustrates a method for simplifying the discovery procedure illustrated in FIG. 6 according to a second embodiment.

Referring to FIG. 9, the second embodiment provides a method for reducing the number of messages transmitted and received during a mutual discovery procedure between CPNS-enabled entities of devices, that is, during an entity discovery procedure. The method will be described below in detail.

User A owns the first device 110 operating as a PNE and the second device 120 operating as a GW. It is assumed herein that the first device 110 is a portable multimedia device and the second device 120 is a cellular phone.

1) The first and second devices 110 and 120 perform a physical connection procedure.

2) Upon completion of the physical connection procedure, the CPNS-enabled entity of the first device 110 checks whether its mode has been set to the GW mode or the PNE mode in order to determine whether it should transmit a Discovery Request message or await reception of the Discovery Request message.

3~4) If the CPNS-enabled entity of the first device 110 is set as a PNE, it waits until the Discovery Request message is received. When the CPNS-enabled entity of the first device 110 does not receive the Discovery Request message for a predetermined time, it prepares to start generating the Discovery Request message.

That is, since each of the CPNS-enabled entities of the first device 110 and the GW does not know the other's mode, they should transmit Discovery Request messages to each other. As a result, information may be redundantly transmitted. To prevent transmission of redundant information, a device operating as a GW first transmits a Discovery Request message immediately after a physical connection is completely established in accordance with this embodiment. In the case where the GW first transmits a Discovery Request message including a PN Info element with information about the PNEs of a PN, a device operating as a PNE does not need to transmit a Discovery Request message to find out the modes of other devices within the PN. Meanwhile, the Discovery Request message transmitted by the GW may include the following elements.

EntityInfo element: It includes information about the CPNS-enabled entity that has transmitted the Discovery Request message.

UserInfo element: It includes information about the user of the CPNS-enabled entity that has transmitted the Discovery Request message. The user information may include User ID and User Name as sub-elements.

PNEID element (or attribute): It indicates the ID of a PNE, if the CPNS-enabled entity transmitting the Discovery Request message is the PNE.

PN GW ID element (or attribute): It indicates the ID of a PN GW, if the CPNS-enabled entity transmitting the Discovery Request message is the PN GW.

PNE Name or PN GW Name element: It provides the name of a PNE if the CPNS-enabled entity transmitting the Discovery Request message is the PNE or the name of a PN GW if the CPNS-enabled entity transmitting the Discovery Request message is the PN GW.

Mode element (or attribute): It provides information about the activated mode of the CPNS-enabled entity transmitting the Discovery Request message, which has a value indicating a PNE or a PN GW. If the activated mode of the CPNS-enabled entity is the PNE mode, the mode element is 1 and if the activated mode of the CPNS-enabled entity is the PN GW mode, the Mode element is 2. Since the GPNS-enabled entity can operate at once as a PNE and as a GW, the Mode element is 3.

PN Info Req element (or attribute): It has a True value or False value. If the CPNS-enabled entity transmitting the Discovery Request message wants to acquire PN information stored by an entity that will receive the Discovery Request message, this element is set to True.

UI Capabilities element (or attribute): If a PN GW should perform user interaction instead of a PNE, this element is set to True. The UI Capabilities element is set by the PNE. For instance, if the PNE does not have a UI, the PNE may set the UI Capabilities element to True so that the PN GW may interact with a user.

Zone based service support element (or attribute): It is set to True, if a PN GW can provide a zone-based service.

PN Info element: It is included if the CPNS-enabled entity transmitting the Discovery Request message is a. PN GW. The PN Info element includes PN ID, PNE Info, etc. as sub-elements. The PN ID sub-element indicates, in the presence of an existing PN, the ID of the PN. The PNE Info sub-element includes, in the presence of an existing PN, information about a PNE included in the PN. The PNE. Info sub-element includes a PNE ID element and a PINE Name element.

After generating the Discovery Request message, the GW transmits the Discovery Request message to detected devices via physical connections. The Discovery Request message may be broadcast.

The above-described Discovery Request message may have the configuration illustrated in Table 1 below.

TABLE 1

| Element | Description |
| --- | --- |
| User Info | UserID and UserName are included as sub-elements. |
| | UserID ID of CPNS user |
| | UserName Name of CPNS user |
| Entity Info | Abbreviation for Entity Information. The following elements may be included: PNEID, PNGWID, Name, Mode, PN Info Req, UI Capa, Zone based service support, and Broadcast group key delivery support. |
| | PNEID ID of PNE |
| | PNGWID ID of PN GW |
| | Name Name of PNE or PN GW |
| | Mode Mode of transmission entity. If the transmission entity is a PNE, Mode is 1, if the transmission entity is a PN GW, Mode is 2, and if the transmission entity can operate simultaneously as a PNE and a GW, Mode is 3. |
| | PNInfoReq If a PNE transmits this message and request PN Info, PNInfoReq is set to True. |
| | UICapa If a device operating as a PNE does not have a UI, UICapa is set to True so that a PN GW can interact with a user. |
| | Zone based service support It is set to True, when a PN GW provides a zone-based service |

TABLE 1-continued

| Element | Description |
| --- | --- |
| PN Info | If the transmission entity of the Discovery Request message is a PN GW and the PN GW has a PN, PN Info includes PN information so that a PNE may join the PN. PN Info may include PN ID, Description, and PNE Info as sub-elements.<br>PNID    ID of PN<br>Description    Description of PN<br>PNE Info    It includes information about PNEs being members of the PN. It may include PNEID and PNE Name as sub-elements. It may further include Device Info as a sub-element.<br>    PNEID    ID of PNE<br>    PNEName    Name of PNE<br>    Device Info    Information about the device. It may include a Mode element and an Inactive Mode element<br>        Mode    Information about current activated mode<br>        Inactive Mode    Inactive mode |

5~7) When the CPNS-enabled entity of the first device 110 receives a Discovery Request message from the third device 210 operating as the GW after starting to generate the Discovery Request message, it discontinues generation of the Discovery Request message. On the other hand, if the CPNS-enabled entity of the first device 110 has completed generation of the Discovery Request message and has already transmitted the Discovery Request message to other devices, it transmits information received in the received Discovery Request message to the other devices.

8) Meanwhile, upon receipt of the Discovery Request message, the CPNS-enabled entity of the first device 110 determines the mode of the other party that has transmitted the Discovery Request message from the Mode element and checks the ID of the other party from the Entity Info element.

If the other party is in the GW mode, the CPNS-enabled entity of the first device 110 generates a Discovery Response message, determining not to transmit an additional Discovery Request message.

Entity Info element: Information about the CPNS-enabled entity that has received the Discovery Request message. It includes User ID and User Name as sub-elements.

PNE ID element: It indicates the ID of a PNE, if the CPNS-enabled entity receiving the Discovery Request message is the PNE.

PNE Name element: It specifies the name of a PNE, if the CPNS-enabled entity receiving the Discovery Request message is the PNE.

Mode element (or attribute): If the CPNS-enabled entity receiving the Discovery Request message can operate in a plurality of modes, the Mode element includes information about an activated mode and a deactivated mode.

UI Capa element: It is set to True if a PN GW is to interact with a user instead of a PNE. This is set by the PNE. For instance, if the PNE does not have a UI, it may set UI Capa to True to allow the PN GW to interact with a user instead.

PN Info element: It is included if PN Info Req is set to True in the received Discovery Request message. If PN Info Req is set to True in the received Discovery Request message, the first device 110 operating as a PNE includes information about PN #1 that has been formed with the second device 120. The PN Info element may include a PN ID element a Description element, etc. as sub-elements.

PNE: Info element: It provides information about members of the PN.

TABLE 2

| Element | Description |
| --- | --- |
| User Info | UserID and UserName are included.<br>UserID    ID of user<br>UserName    Name of user |
| EntityInfo | Abbreviation for Entity Information. The following sub-elements may be included: PNEID, PNGWID, Name, Mode, PN Info Req, and UI Capa.<br>PNEID    ID of PNE<br>PNGWID    ID of PN GW<br>Name    Name of PNE or PN GW<br>Mode    Mode of transmission entity of the Discovery Response message. If the transmission entity is a PNE, Mode is 1, if the transmission entity is a PN GW, Mode is 2, and if the transmission entity can operate simultaneously as a PNE and a GW, Mode is 3.<br>UICapa    If a device operating as a PNE does not have a UI, UICapa is set to True so that a PN GW can interact with a user. |

TABLE 2-continued

| Element | Description |
|---|---|
| PNInfo | If the transmission entity of the Discovery Response message is a PNE and the PNE has already joined another PN, PN Info includes information about the PN. PNInfo may include PN ID, Description, and PNE Info as sub-elements. |
|   PNID | ID of PN |
|   Description | Description of PN |
|   PNEInfo | It includes information about PNEs being members of the PN. It may include PNEID and PNE Name as sub-elements. It may further include Device Info as a sub-element. |
|     PNEID | ID of PNE |
|     PNEName | Name of PNE |
|     DeviceInfo | Information about the device. It may include a Mode element and an InactiveMode element. |
|       Mode | Information about current activated mode |
|       Inactive Mode | Information about deactivated mode |

After transmitting the afore-described Discovery Response message, the CPNS-enabled entity of the first device 110 checks the modes of devices and additionally Checks PN information in the received Discovery Request message.

9) The third device 210 operating as the GW, which has received the Discovery Response message, checks the modes of devices and additionally checks PN information in the received Discovery Response message.

The embodiments of the present invention described above can be combined. Therefore, each embodiment may be implemented in combination with other embodiments rather than it is implemented alone. Those skilled in the art, can easily practice the combination of embodiments of the present invention, which will not be described in detail. Even though the combination of embodiments of the present invention is not described, it is not excluded from the present invention and should be interpreted as included in the scope of the present invention.

The embodiments of the present invention may be achieved by various means, for example, hardware, firmware, software, or a combination thereof.

In a hardware configuration, embodiments of the present invention may be achieved by one or more ASICs (application specific integrated circuits), DSPs (digital signal processors), DSDPs (digital signal processing devices), PLDs (programmable logic, devices), FPGAs (field programmable gate arrays), processors, controllers, microcontrollers, microprocessors, etc.

In a firmware or software configuration, the methods according to the embodiments of the present invention may be implemented in the form of a module, a procedure, a function, etc. Software code may be stored in a memory unit and executed by a processor. The memory unit is located at the interior or exterior of the processor and may transmit data to and receive data from the processor via, various known means.

For example, the methods of the present invention can be stored in a storage medium (e.g. an internal memory, a flash memory, a hard disk, etc.) and can be implemented into codes or commands in a software program executed by a processor (e.g. a microprocessor). This will be described with reference to FIG. 10.

Figure 10:
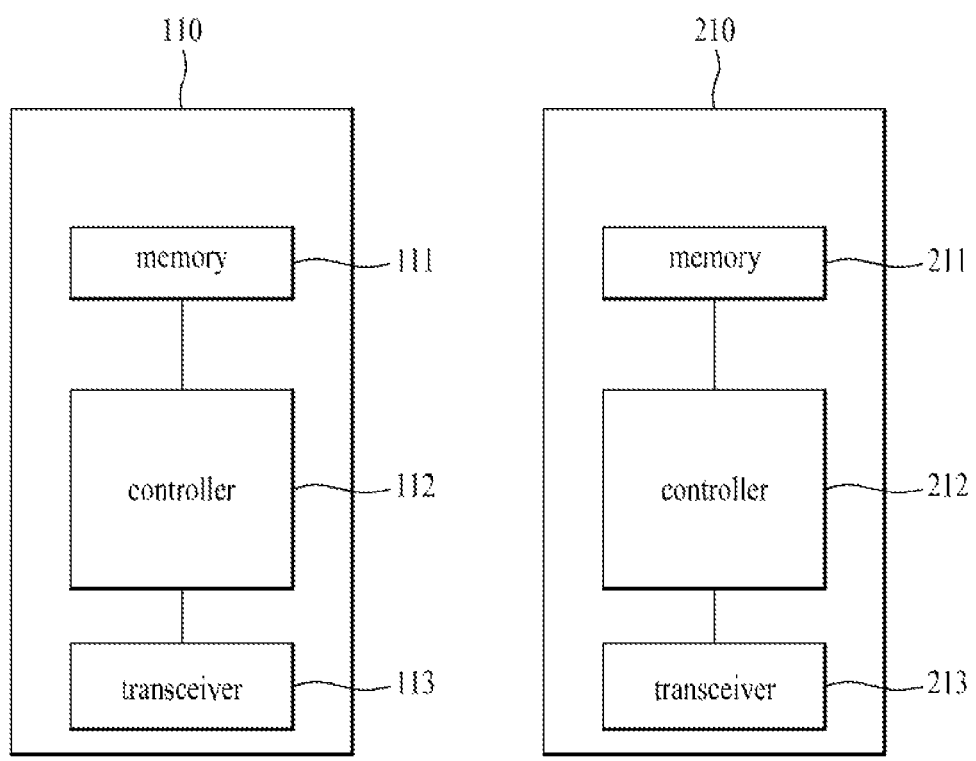
FIG. 10 is a block diagram of devices according to embodiments of the present invention.

FIG. 10 is a block diagram of devices according to embodiments of the present invention.

Referring to FIG. 10, the first device 110 includes a memory ill, a controller 112, and a transceiver 113. The third device 210 includes a memory 211, a controller 212, and a transceiver 213.

The memories 111 and 211 store the methods illustrated in FIGS. 2 to 9.

The controllers 112 and 212 control the memories 111 and 211 and the transceivers 113 and 213. Specifically, the controllers 112 and 212 perform the methods stored in the memories 111 and 211 and transmit the afore-described signals through the transceivers 113 and 213.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

The invention claimed is:

1. A method for detecting another device by a first device having a Converged Personal Network Service (CPNS)-enabled entity, the method comprising:
   receiving a first discovery request message from a second device after performing a physical connection procedure with the second device, the received first discovery request message including information about mode of the second device and information about a network to which the second device belongs;
   transmitting a discovery response message to the second device in response to the first discovery request message, the discovery response message including information about a mode of the first device; and
   determining whether the first device transmits a second discovery request message to a third device detected by the first device or not based on the information included in the received first discovery request message,
   wherein, when the information about the mode of the second device in the first discovery request message indicates that the second device is a gateway, then it is determined that the first device does not transmit the second discovery request message to the third device.

2. The method according to claim 1, wherein the first or second discovery request message is an Entity Discovery Request message or the discovery response message is an Entity Discovery Response message.

3. The method according to claim 1, further comprising checking the information about the mode of the second device in the first discovery request message.

4. The method according to claim 1, further comprising:
   determining whether the CPNS-enabled entity is set to the PNE mode, after performing the physical connection procedure with the second device; and
   performing a physical connection procedure with the second device and then awaiting reception of the first discovery request message, if the CPNS-enabled entity is set to the PNE mode.

5. The method according to claim 1, further comprising:
   transmitting a registration request message to the second device so that the registration request message is transmitted to a server and transmitting additional information needed for physical connections to other devices to the second device so that the additional information is transmitted to the server;
   receiving information valid only between the CPNS-enabled entity and the server; and
   completing the physical connection procedure by transmitting the information valid only between the CPNS-enabled entity and the server to another device, if the first device searches for a physically connectable another device.

6. A device having a Converged Personal Network Service (CPNS)-enabled entity, the device comprising:
   a transceiver for receiving a first discovery request message from a second device, after performing a physical connection procedure with the second device, the received first discovery request message including information about mode of the second device and information about a network to which the second device belongs, the transceiver being configured to transmit a discovery response message to the second device in response to the first discovery request message, the discovery response message including information about a mode of the first device; and
   a processor for determining whether the first device transmits a second discovery request message to a third device detected by the first device or not based on the information included in the received first discovery request message,
   wherein, when the information about the mode of the second device in the first discovery request message indicates that the second device is a gateway, then it is determined that the first device does not transmit the second discovery request message to the third device.

* * * * *